United States Patent [19]

Nishikawa

[11] Patent Number: 4,625,591

[45] Date of Patent: Dec. 2, 1986

[54] CREEP PREVENTING DEVICE FOR VEHICLES EQUIPPED WITH AN AUTOMATIC TRANSMISSION

[75] Inventor: Masao Nishikawa, Tokyo, Japan

[73] Assignee: Honda Giken Kogyo Kabushiki Kaisha, Tokyo, Japan

[21] Appl. No.: 593,775

[22] Filed: Mar. 27, 1984

[30] Foreign Application Priority Data

Mar. 28, 1983 [JP] Japan .................................. 58-52028
Mar. 28, 1983 [JP] Japan .................................. 58-52029

[51] Int. Cl.$^4$ ........................ B60K 41/18; B60K 41/16
[52] U.S. Cl. ........................................ 74/866; 74/867
[58] Field of Search .................. 74/869, 868, 867, 866

[56] References Cited

U.S. PATENT DOCUMENTS

| | | | |
|---|---|---|---|
| 3,890,856 | 6/1975 | Miyauchi et al. ..................... | 74/869 |
| 4,313,353 | 2/1982 | Honig .............................. | 74/867 X |
| 4,494,640 | 1/1985 | Honig .............................. | 74/868 X |
| 4,503,733 | 3/1985 | Hasegawa .......................... | 74/866 X |
| 4,513,638 | 4/1985 | Nishikawa et al. .................. | 74/866 |
| 4,513,639 | 4/1985 | Hiramatsu ......................... | 74/866 |

FOREIGN PATENT DOCUMENTS

| | | | |
|---|---|---|---|
| 3019274 | 11/1981 | Fed. Rep. of Germany ........ | 74/866 |
| 0063046 | 5/1980 | Japan ................................... | 74/866 |

*Primary Examiner*—Kenneth J. Dorner
*Assistant Examiner*—Dirk Wright
*Attorney, Agent, or Firm*—Armstrong, Nikaido Marmelstein & Kubovcik

[57] ABSTRACT

A creep preventing device for vehicles equipped with an automatic transmission comprising:
  a fluid type torque converter;
  an auxiliary transmission which has a frictionally engaging element for starting, and which is coupled to said torque converter; and
  a creep preventing valve disposed in an oil path that is branched from an operation oil path leading to said frictionally engaging element and that leads to an oil tank, said creep preventing valve being adapted to open said oil path during the idle operation of the vehicle,
  wherein the creep preventing valve is constructed such that it is operated in the opening direction or the closing direction by the pressure of a source of hydraulic pressure.

According to another aspect of the invention, furthermore, the creep preventing valve has an oil chamber which closes the valve when a hydraulic pressure greater than a predetermined value is introduced thereinto, and to said oil chamber is connected an oil path which guides a hydraulic pressure from means that produces a signal pressure proportional to the vehicle speed.

6 Claims, 3 Drawing Figures

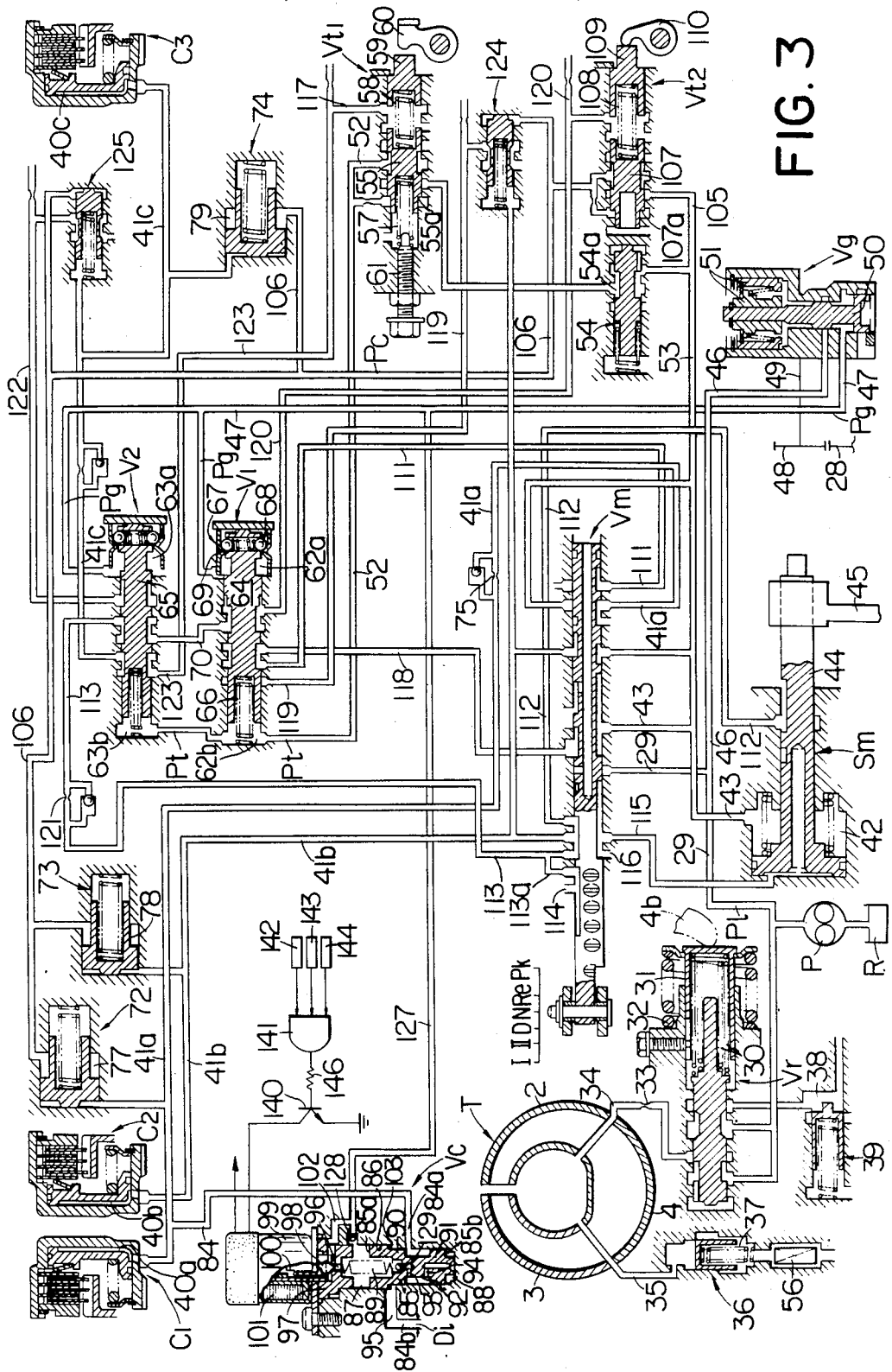

CREEP PREVENTING DEVICE FOR VEHICLES EQUIPPED WITH AN AUTOMATIC TRANSMISSION

BACKGROUND OF THE INVENTION

1. Field of the Invention

The present invention relates to a creep preventing device for vehicles equipped with an automatic transmission.

2. Description of the Prior Art

With a shift lever being set to the drive position (forward-movement position) during a stop, vehicles equipped with an automatic transmission develop a so-called creep phenomenon which pulls the vehicle forward against the intention of the driver due to the dragging torque of a torque converter. Such a creep force applies a brake force to the engine during the idle operation. To hold the number of revolutions of the engine during the idle operation at a reference value, therefore, it is required to increase the opening degree of a throttle valve during the idle operation to a certain extent to compensate the brake force. This increases the fuel consumption as a matter of course and was one of primary causes to deteriorate the fuel efficiency of vehicles equipped with an automatic transmission.

The assignee of the present invention therefore has previously proposed an improvement in that the idle operating condition of the vehicle is detected and the pressure exerting on a starting clutch is by-passed to an oil tank to interrupt power transmission between the engine and drive wheels, so that the load upon the engine assumes the same level as that in vehicles equipped with a manual transmission. Such an improvement has, however, accompanied a drawback as described below. That is, if response characteristics are taken into consideration at the time of starting, the pressure exerting on the starting clutch should not be reduced to zero, but should rather be maintained at a weak pressure Po which is not so great as the force of a return spring in the clutch, during the condition in which the creep is to be prevented from developing. This pressure Po is very weak, i.e., about 1 atm. To maintain the pressure Po as precisely as possible, a relief valve is suitably used as a means for escaping the pressure into the oil tank. Namely, the construction is such that the pressure is introduced into a spring chamber via a throttle, and a circuit for communicating the spring chamber with the oil tank is opened or closed by a pilot valve, in order that the valve is urged toward the opening side by the pressure and that the valve is urged toward the closing side by the force of spring. However, since the pressure Po is very weak as mentioned above, the spring which urges the valve toward the closing side must also have a very weak force. Therefore, if the oil contains impurities such as dust and dirt, the valve fails to operate smoothly, the creep preventing mechanism fails to operate, and the starting clutch is reengaged with decreased reliability. This results from the weak spring force as described above; i.e., the valve fails to return to the rest position, or its returns to the rest position being delayed. This problem can be solved if a spring having an increased force is employed, making, however, it necessary to use the valve of a large size to prevent the creep.

In view of the above-mentioned problems, the present invention provides a creep preventing device for vehicles equipped with an automatic transmission, in which the creep preventing valve operates with increased reliability, since the creep preventing valve, which permits the pressure for engaging the starting friction elements to escape into the oil tank during the idle operation, is returned to the inoperative position not only by the force of a return spring but also by a hydraulic servo force.

According to a first feature of the present invention, to achieve the above-mentioned object, the creep preventing valve is so constructed as to move in two directions, i.e., opening direction and closing direction, by the pressure of the source of hydraulic pressure. This makes it possible to utilize the hydraulic servo force for returning the creep preventing valve to the inoperative position, eliminating such probabilities that the valve is not returned to the rest position or is returned with some delay due to weak spring force. Accordingly, the creep preventing valve need not be constructed in a large size to reinforce the spring force, and increased reliability in operation can be obtained.

Further, the below-mentioned inconvenience develops in the automatic transmission in which the pressure of the starting clutch is by-passed to the oil tank during the idle operation and a transmission gear train (such as low-speed gear train) at the time of idle operation is also used when the engine brake is applied. That is, there will be no problem when all of the systems are properly working. However, if the system is maintained in a condition intended for preventing the creep due to some trouble, the low-speed gear train is not put into use for applying the engine brake. Therefore, the vehicles which have a shift position at which the engine brake is applied with the low-speed gear train can be brought into halt relying upon the foot brake only. Such troubles may develop in cases where the sensor system becomes defective to erroneously judge the running condition as idle operation, where the actuator portions become defective to maintain the condition for preventing creep though the sensor systems and judging systems are properly functioning, and the like. In particular, the hydraulic pressure switching valve as a final actuator may lose smooth operation if dust and dirt are contained in the oil, and may not often return to the inoperative position since the return spring has a weak force.

This sort of trouble does not develop with the vehicles which do not have a shift position where the engine brake is applied with the low-speed gear train. With the vehicles of the type which applies the engine brake with a middle-speed gear train, however, the reduction ratio of the middle-speed gear train could not be arbitrarily reduced from the point of view in maintaining satisfactory braking performance, and this caused considerable restriction on improving its fuel consumption.

The present invention was accomplished in view of such problems, and its object is to provide a creep preventing device for vehicles equipped with an automatic transmission, which is capable of preventing the occurrence of creep phenomenon when the starting gear train is selected and which is capable of applying the engine brake with the starting gear train, wherein the function of engine brake is not lost even in case the creep preventing mechanism becomes defective at the operating position thereof.

According to a second feature of the present invention, for attaining the above-mentioned object, a creep preventing valve has an oil chamber which closes the creep preventing valve when a hydraulic pressure greater than a predetermined value is introduced thereinto, and to the oil chamber is connected an oil path which guides the hydraulic pressure from a signal generator means which produces a signal pressure in proportion to the vehicle speed.

Therefore, even if the electric signal system becomes defective or dust and dirt are contained in the oil and the valve is not closed during the idle operation, the valve can be reliably moved to the closing position by the hydraulic pressure, and the engine brake can be reliably applied.

The above-mentioned and other objects, features and advantages of the present invention will become obvious from the following description of preferred embodiments in conjunction with the accompanying drawings.

BRIEF DESCRIPTION OF THE DRAWINGS

FIGS. 1 and 2 illustrate an embodiment of the present invention, in which:

FIG. 1 is a schematic diagram showing an automatic transmission for automobiles with three forward speeds and one reverse speed, to which the present invention is applied;

FIG. 2 is a diagram of a hydraulic pressure control circuit; and

FIG. 3 is a diagram of a hydraulic pressure control circuit according to another embodiment, as corresponding to FIG. 2.

DESCRIPTION OF THE PREFERRED EMBODIMENTS

Figure 1:
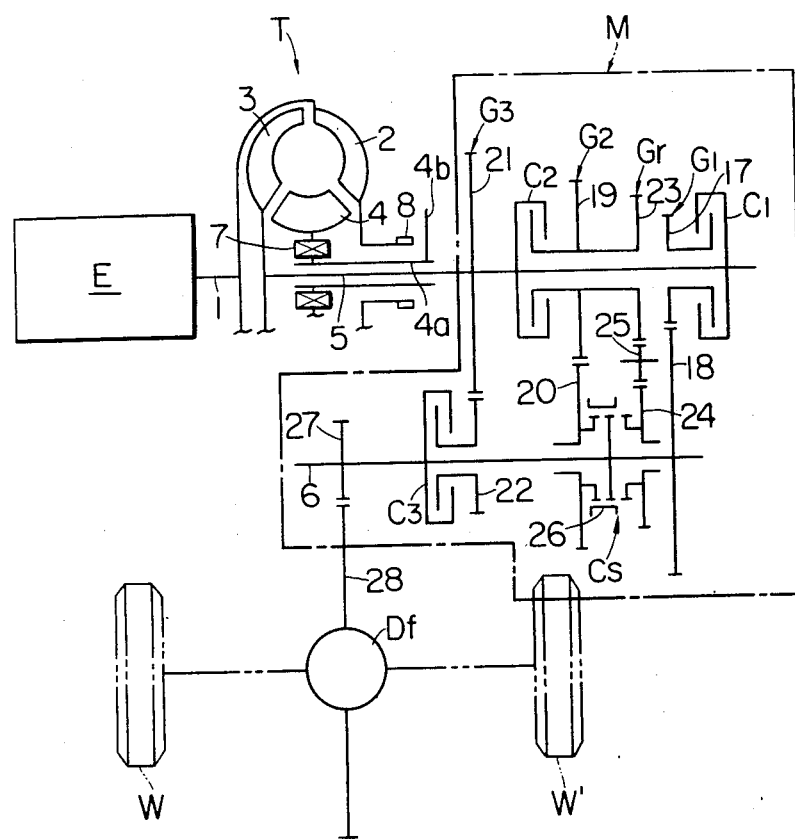

Embodiments of the present invention will be described below with reference to the drawings. Referring first to FIG. 1 which schematically shows an automatic transmission for an automobile with three forward speeds and one reverse speed, the output of an engine E is transmitted from a crank shaft 1 to drive wheels W, W' via a torque converter T, an auxiliary transmission M and a differential device Df in the order mentioned, to drive the wheels.

The torque converter T comprises a pump vane wheel 2 connected to the crank shaft 1, a turbine vane wheel 3 connected to an input shaft 5 of the auxiliary transmission M, and a stator vane wheel 4 connected through a one-way clutch 7 to a stator shaft $4a$ that is supported on the input shaft 5 to rotate relatively thereto. The torque transmitted from the crank shaft 1 to the pump vane wheel 2 is then transmitted to the turbine vane wheel 3 fluid-dynamically. When the torque is amplified during this period, the stator vane wheel 4 bears the reaction thereof, as is widely known.

Figure 2:
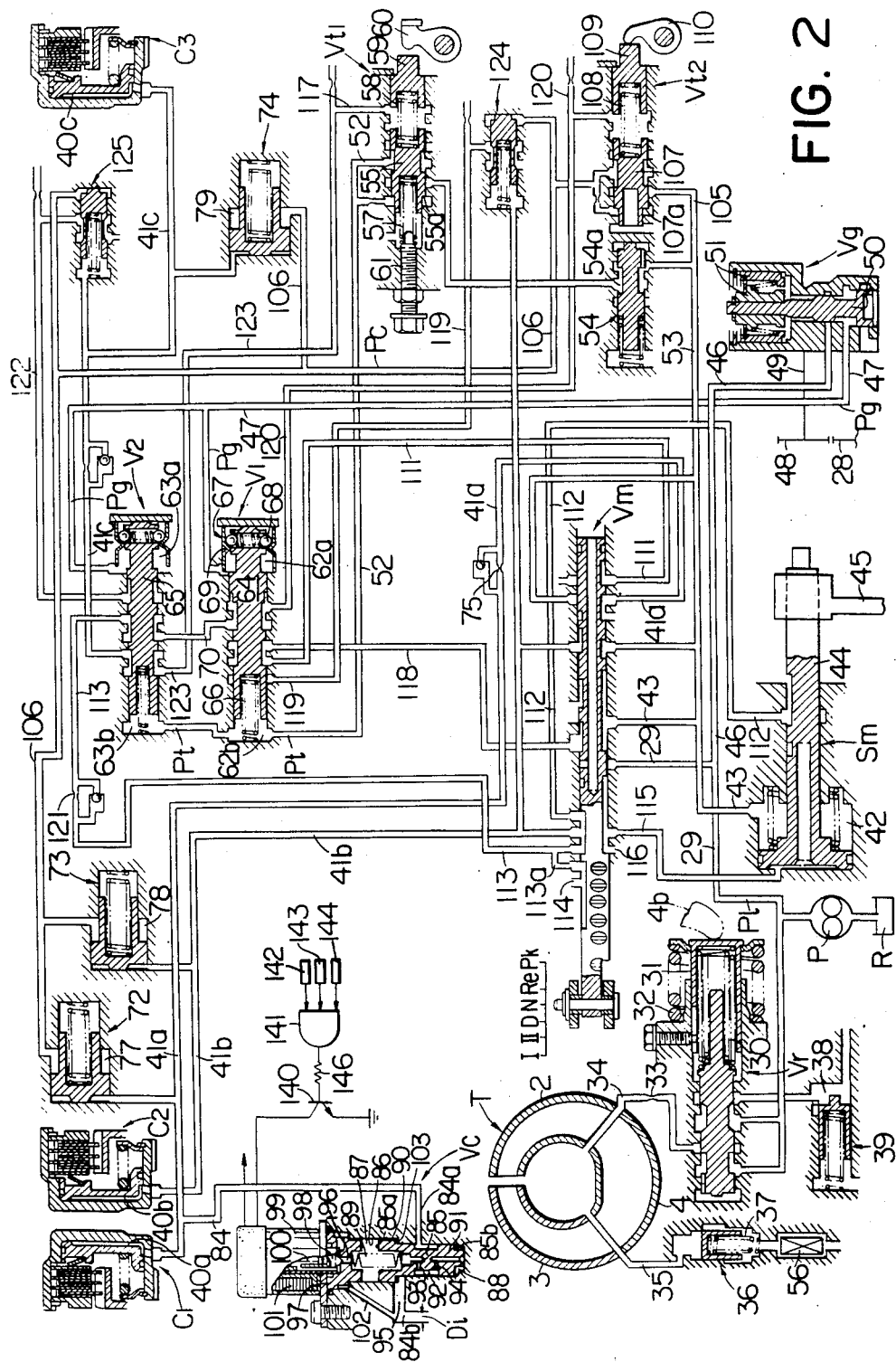

A pump drive gear 8 for driving a hydraulic pressure pump P shown in FIG. 2 is provided on the right end of the pump vane wheel 2, and a stator arm $4b$ for controlling a regulator valve Vr shown in FIG. 2 is secured to the right end of the stator shaft $4a$.

Between the input and output shafts 5, 6 parallel to each other of the auxiliary transmission M, there are provided in parallel a low-speed gear train $G_1$, a middle-speed gear train $G_2$, a high-speed gear train $G_3$, and a reverse gear train Gr. The low-speed gear train $G_1$ consists of a drive gear 17 connected to the input shaft 5 through a low-speed clutch $C_1$ that serves as a frictionally engaging element for starting, and a driven gear 18 which is secured on the output shaft 6 and which meshes with the gear 17. The middle speed gear train $G_2$ consists of a drive gear 19 connected to the input shaft 5 through a middle-speed clutch $C_2$ and a driven gear 20 which is connected to the output shaft 6 via a switching clutch Cs and which meshes with the gear 19. The high-speed gear train $G_3$ consists of a drive gear 21 secured to the input shaft 5 and a driven gear 22 connected to the output shaft 6 through a high-speed clutch $C_3$. The reverse gear train Gr consists of a drive gear 23 formed together with the drive gear 19 in the middle-speed gear train $G_2$ as a unitary structure, a driven gear 24 connected to the output shaft 6 through the switching clutch Cs, and an idle gear 25 meshed with the two gears 23 and 24. The switching clutch Cs is disposed between the driven gears 20 and 24. These driven gears 20, 24 can be selectively coupled to the output shaft 6 by shifting a selector sleeve 26 of the clutch Cs to the forward position on the lefthand in the drawing or to the reverse position on the righthand in the drawing.

If the low-speed clutch $C_1$ only is connected with the selector sleeve 26 being held at the forward position as shown, the drive gear 17 is connected to the input shaft 5 to establish the lowspeed gear train $G_1$, so that the torque is transmitted from the input shaft 5 to the output shaft 6 through the gear train $G_1$. Next, when the middle-speed clutch $C_2$ is connected with the low-speed clutch $C_1$ being disengaged, the drive gear 19 is connected to the input shaft 5 to establish the middle-speed gear train $G_2$, so that the torque is transmitted from the input shaft 5 to the output shaft 6 through the gear train $G_2$. When the high-speed clutch $C_3$ is connected with the low-speed clutch $C_1$ and the middle-speed clutch $C_2$ being disengaged, the driven gear 22 is connected to the output shaft 6 to establish the high-speed gear train $G_3$, so that the torque is transmitted from the input shaft 5 to the output shaft 6 through the gear train $G_3$. Next, when the selector sleeve 26 is switched to the reverse position on the righthand to connect the middle-speed clutch $C_2$ only, the drive gear 23 is connected to the input shaft 5 and the driven gear 24 is connected to the output shaft 6, respectively, to establish the reverse gear train Gr, so that the torque is transmitted from the input shaft 5 to the output shaft 6 through the gear train Gr.

The torque transmitted to the output shaft 6 is then transmitted from an output gear 27 provided at the end of the shaft 6 to a large-diameter gear 28 of the differential device Df.

Referring now to FIG. 2, the hydraulic pressure pump P sucks the oil from an oil tank R and feeds the pressurized oil to an operation oil path 29. The pressurized oil is regulated to a predetermined pressure by the regulator valve Vr, and is sent to a manual valve Vm. This oil pressure is referred to as line pressure Pl.

The regulator valve Vr has a pressure-regulating spring 30 and a spring-receiving cylinder 31 for supporting an outer end of the spring 30. The spring-receiving cylinder 31 moves toward the right and left to adjust the load which is set by the pressure-regulating spring 30. The stator arm $4b$ comes into contact with the outer surface of the spring-receiving cylinder 31 so as to apply the reaction to the stator vane wheel 4, i.e., to apply the stator reaction thereto. A stator spring 32 for receiving the stator reaction is connected to the spring-receiving cylinder 31. Accordingly, when the stator reaction increases, the stator spring 32 is compressed, and the spring-receiving cylinder 31 moves toward the left to increase the load set by the pressure-regulating spring 30, whereby the line pressure Pl in the operation oil path 29 increases.

A part of pressurized oil regulated by the regulator valve Vr is introduced into the torque converter T via an inlet oil path 34 having a throttle 33 to pressurize the interior of the converter T to prevent the cavitation. The internal pressure is determined by the size of the throttle 33, strength of a spring 37 of a check valve 36 provided in an outlet oil path 35 of the torque converter T, and the like.

The oil which has passed through the check valve 36 returns to the oil tank R via an oil cooler 56.

The surplus of pressurized oil discharged from the hydraulic pressure pump P is introduced to a lubricating oil path 38 from the regulator valve Vr and is sent to various lubricating portions. A pressure-regulating valve 39 is connected to the lubricating oil path 38 in order to maintain a minimum of the required oil pressure.

When the manual valve Vm is at the neutral position as shown, the pressurized oil fed to the valve Vm is not fed to any of the clutches $C_1$, $C_2$, $C_3$ nor to various other hydraulic pressure operation portions. Therefore, the three clutches $C_1$, $C_2$ and $C_3$ are all placed in the disengaged state, and the torque of the engine E is not transmitted to the wheels W, W'.

When the manual valve Vm is shifted by one step from the illustrated position to the drive position D, the operation oil path 29 from the hydraulic pressure pump P is communicated with oil paths 43, 118, and an oil path 111 is communicated with an operation oil path 41a which leads to a hydraulic pressure cylinder 40a of the low-speed clutch $C_1$ and which is equipped with a unidirectional throttle 75. On the other hand, an oil path 112 is disconnected from an operation oil path 41b which leads to a hydraulic pressure cylinder 40b of the middle-speed clutch $C_2$, and an oil path 113a is disconnected from an exhaust port 114. An oil path 115 remains communicated with an exhaust port 116. The operation oil path 43 is communicated with a spring chamber 42 of a hydraulic pressure servo motor Sm for shifting the selector sleeve 26. Therefore, a piston 44 of the servo motor Sm remains at the left position in the drawing to hold the selector sleeve 26 at the forward position in FIG. 1 via a shift fork 45. Therefore, the reverse gear train Gr is placed in the inoperative condition.

An input oil path 46 communicated with an input port of a governor valve Vg is branched from the operation oil path 29, and a first signal oil path 47 extends from an output port of the valve Vg.

The governor valve Vg, which is well known, rotates about its own rotary shaft 49 driven by a gear 48 which meshes with the large-diameter gear 28 of the differential device Df. Thus, the governor valve Vg rotates at a speed in proportion to the vehicle speed, and produces a hydraulic pressure or governor pressure Pg proportional to the vehicle speed to the first signal oil path 47, relying upon the centrifugal force that acts upon a weight 51 of a spool valve body 50.

An oil path 53 is branched from the operation oil path 43 and is connected to a first throttle valve $Vt_1$ through a modulator valve 54. The modulator valve 54 is a pressure reducing valve which is urged toward the closing side by a spring force and is also closed by the modulator pressure at an output port 54a, to determine the upper limit of the inlet pressure of the first throttle valve $Vt_1$.

The first throttle valve $Vt_1$, which is well known, comprises a spool valve body 55, a control spring 58 for leftwardly pushing the valve body 55, a return spring 57 for rightwardly pushing the valve body 55, a control piston 59 for supporting the outer end of the control spring 58, a control cam 60 which turns accompanying an increase in the opening degree of the throttle valve of the engine E to leftwardly move the control piston 59, and an adjusting bolt 61 capable of adjusting the load set by the return spring 57. When the control piston 59 moves leftwards, the displacement thereof is transmitted to the spool valve body 55 via the control spring 58 to push the spool valve body 55 leftwardly. Accompanying this leftward movement, the hydraulic pressure released to a second signal oil path 52 acts upon a left shoulder portion 55a of the spool valve body 55 so as to push back the spool valve body 55 rightwardly. Therefore, the first throttle valve $Vt_1$ releases a hydraulic pressure or throttle pressure Pt proportional to the opening degree of the throttle valve of the engine E, to the second signal oil path 52. Here, the turn of the control cam 60 in the counterclockwise direction continuously throttles the communication between an oil path 117 and the oil tank R.

The first and second signal oil paths 47, 52 are connected to pilot hydraulic pressure chambers 62a, 62b; 63a, 63b at the ends of a low-middle speed shift valve $V_1$ and at the ends of a middle-high speed shift valve $V_2$. Therefore, the spool valve bodies 64, 65 of these shift valves $V_1$, $V_2$ receive on both end surfaces thereof the governor pressure Pg and the throttle pressure Pt, and operate as described below.

That is, the spool valve body 64 of the low-middle speed shift valve $V_1$ initially remains at the right position as shown due to the force of a spring 66. Therefore, the oil path 118 is communicated with the operation oil path 41a through the oil path 111, so that the low-speed clutch $C_1$ is engaged by the application of pressure. Then, as the governor pressure Pg increases with the increase in the vehicle speed, and as the leftwardly moving force of the spool valve body 64 produced by the governor pressure Pg overcomes the rightwardly moving force of the valve body 64 produced by the throttle pressure Pt and the spring 66, a click ball 68 which moves together with the valve body 64 in a click motion mechanism 67 provided at the right end of the valve body 64 gets over a fixed positioning projection 69, and the valve body 64 is rapidly switched to the left position. Hence, the oil path 111 is communicated with a drain oil path 119, and an oil path 118 is communicated with an oil path 70. The oil path 70 is disconnected from the drain oil path 120. Under this condition, if the middle-high speed shift valve $V_2$ is located at the position as shown, the oil path 70 is communicated with an oil path 113 provided with a unidirectional throttle 121, and is further communicated with the operation oil path 41b via the manual valve Vm. Therefore, the operation oil is supplied to the hydraulic pressure cylinder 40b, and the middle speed clutch $C_2$ is engaged by the application of pressure. As a result, the middle-speed gear train $G_2$ is established.

As the vehicle speed further increases, similar operation takes place in the middle-high speed shift valve $V_2$. That is, the spool valve body 65 of the valve $V_2$ is moved leftwards due to the increasing governor pressure Pg, so that the oil path 113 is communicated with a drain oil path 122, the oil path 70 is communicated with the operation oil path 41c leading to the hydraulic pressure cylinder 40c of the high-speed clutch $C_3$, and the operation oil path 41c is disconnected from a drain oil path 123. Therefore, the middle-speed clutch $C_2$ is liberated from its engaged state, and instead the high-speed clutch $C_3$ is engaged by the application of pressure to establish the high-speed gear train $G_3$.

To reduce the shock at the time of speed change, accumulators 72, 73, 74 are connected hydraulically in parallel with the clutches $C_1$, $C_2$, $C_3$. Further, a 1–2 orifice control valve 124 is provided in the drain oil path 119, and a 2–3 orifice control valve 125 is provided in the drain oil path 122.

A control hydraulic pressure Pc is guided from a second throttle valve $Vt_2$ to back pressure chambers 77, 78, 79 of the accumulators 72, 73, 74 via an oil path 106. The second throttle valve $Vt_2$ is interposed between an oil path 105 branched from the oil path 53 and the oil path 106, and comprises a spool valve body 107, a control spring 108 for leftwardly pushing the valve body 107, a control piston 109 for supporting the outer end of the control spring 108, and a control cam 110 which turns accompanying the increase in the opening degree of throttle valve of the engine E to leftwardly move the control piston 109. As the control piston 109 moves leftwardly, the displacement thereof is transmitted to the spool valve body 107 via the control spring 108; i.e., the spool valve body 107 moves toward the left. Accompanying the leftward movement, the hydraulic pressure released to the oil path 106 acts upon a left shoulder portion 107a of the spool valve body 107 so as to push back the spool valve body 107 rightwardly. In this way, the second throttle valve $Vt_2$ applies the control hydraulic pressure Pc proportional to the opening degree of throttle valve of the engine E to the back pressure chambers 77 to 79 of the accumulators 72 to 74 via the oil path 106. Here, the turn of the control cam 110 in the counterclockwise direction continuously throttles the communication between the drain oil path 120 and the oil tank R.

When the vehicle speed decreases, the valve body 65 of the middle-high speed shift valve $V_2$ is first moved rightwardly to shift the high-speed gear ratio to the middle-speed gear ratio. As the vehicle speed further decreases, the valve body 64 of the low-middle speed shift valve $V_1$ is moved rightwards to assume the low-speed gear ratio. It is important that the operation oil is supplied to the low-speed clutch $C_1$ via the unidirectional throttle 75, when the low-speed gear ratio is assumed in the drive position D.

The operation oil path 41a is connected at its middle portion to the accumulator 72, and an oil path 84 directly connected to the oil tank R is connected to a middle portion of the operation oil path 41a. A creep preventing valve Vc of the pilot type is disposed in the middle portion of the oil path 84.

The creep preventing valve Vc has a spool valve body 85 which is housed in a cylindrical valve chamber 86 formed in the intermediate of the path 84 so as to divide the oil path 84 into the upstream portion 84a and the downstream portion 84b, whereby oil chambers 87, 88 are defined in the upper and lower portions of the valve body 85, respectively. A return spring 89 for downwardly urging the spool valve body 85 is housed in the upper oil chamber 87. The spool valve body 85 comprises a pair of upper and lower lands 90, 91, an annular groove 92 located therebetween, and orifices 93, 94 for communicating the groove 92 with the upper oil chamber 87 and the lower oil chamber 88, respectively. The annular groove 92 is always communicated with the upstream portion 84a, and the upper land 90 moves up and down to open and close a port 95 of the downstream portion 84b opened to the valve chamber 86. The port 95 is preferably formed in a circular shape in cross section, such that the effective opening area gradually increases as the upper land 90 moves upwards.

An end wall member 97 having an orifice 96 is provided at the upper end of the valve chamber 86, and an electromagnetic valve 99 having a pilot needle valve 98 adapted to open and close the orifice 96 is disposed above the end wall member 97. The needle valve 98 is urged by the resilient force of a spring 100 to close the orifice 96 while opening the orifice 96 when a solenoid 101 is excited. The orifice 96 in an opened state, is communicated with a by-pass oil path 102 branched from the downstream portion 84b of the oil path 84.

When the solenoid 101 is excited and the orifice 96 is opened, the upper oil chamber 87 is communicated with the oil tank R via the orifice 96 and the by-pass oil path 102. Therefore, the hydraulic pressure in the upper oil chamber 87 decreases, and the spool valve body 85 is moved upwards by the force acting upon the lower end surface faced to the lower oil chamber 88, to open the oil path 84. The pressure in the operation oil path 41a, i.e., the pressure applied to the low-speed clutch $C_1$ at this time, is determined by the return spring 89 and the effective sectional area of the spool valve body 85. By setting the pressure to be lower than the pressure for engaging the low-speed clutch $C_1$, therefore, it is possible to prevent the creep phenomenon from developing. When the valve body 64 of the low-middle speed shift valve $V_1$ or the valve body 65 of the middle-high speed shift valve $V_2$ is moved leftwards to establish the middle-speed gear ratio or the high-speed gear ratio, the hydraulic pressure in the operation oil path 41a becomes zero. Therefore, the spool valve body 85 does not move upwards, and the creep preventing valve Vc does not operate.

Here, attention should be given to that a first pressure receiving surface 85a of the spool valve body 85 facing the upper oil chamber 87 is greater than a second pressure receiving surface 85b thereof facing the lower oil chamber 88. A shoulder portion 103 which produces a difference between the pressure receiving areas is located facing the opening port 95, and does not affect the movement of the valve body 85 in the upper and lower directions. When the pilot needle valve 98 is closed, the pressure becomes equal between the upper and lower oil chambers 87 and 88, and the valve body 85 moves to the closing position due to the downward force consisting of a force of the return spring 89 and a force obtained by multiplying the difference between the pressure receiving areas 85a and 85b by the hydraulic pressure.

The solenoid 101 of the electromagnetic valve 99 is grounded via a transistor 140, and an output of an AND gate 141 is connected to the base of the transistor 140 through a resistor 146. To the input terminals of the AND gate 141 are connected a shift position sensor 142 which produces a signal of the high level when the shift lever is shifted to the drive position D, an engine speed sensor 143 which detects the speed of revolution of the engine E and which produces a signal of the high level when the detected speed is lower than a reference value, and a braking sensor 144 which produces a signal of the high level when the brake pedal is trod on. Therefore, when the vehicle is stopped at a street intersection with a foot placed on the brake pedal, the sensors 142 to 144 all produce signals of the high level, whereby the solenoid 101 is excited to open the creep preventing valve Vc, and the creep phenomenon is prevented from occurring.

The throttle 75 provided in an intermediate portion of the oil path 41a plays an important role for preventing the creep from developing. If a diameter of the throttle 75 is denoted by d, a diameter of the downstream portion 84b of the oil path 84 in the creep preventing valve Vc by Di, a discharge pressure of the hydraulic pressure pump P by Pl, and a hydraulic pressure of the operation oil path 41a by p, then the following relation is established:

$$\frac{\pi d^2}{4} \sqrt{Pl - p} = \frac{\pi Di^2}{4} \sqrt{p}$$

Here, if $Pl = 8.5$ kg/cm$^2$, $p = 1.0$ kg/cm$^2$, and $d = 1.7$ mm, then the diameter Di is 2.8 mm. In practice, the diameter Di is selected to be 5 to 6 mm $\phi$ by taking other factors into consideration. In any event, Di does not have a large value. To obtain good response characteristics at the time of starting, furthermore, the creep preventing valve Vc is disposed as close as possible to the low-speed clutch $C_1$.

When the manual valve Vm is shifted to a position other than the drive position, e.g., shifted to a first speed retaining position I, the low-speed clutch $C_1$ only is engaged by the application of pressure. When the manual valve Vm is shifted to a middle-speed retaining position II or to a reverse position Re, the middle-speed clutch $C_2$ only is engaged by the application of pressure to establish the middle-speed gear train $G_2$ or the reverse gear train Gr. In particular, when the manual valve Vm is shifted to the reverse position Re, the piston 44 of the servo motor Sm receives the hydraulic pressure on the left end surface thereof, and the spring chamber 42 is connected to the oil tank R. Therefore, the piston 44 moves rightwardly to establish the reverse gear train Gr as described above. Among the shift positions of the manual valve Vm, Pk denotes a parking position.

Next, operation of this embodiment will be explained. It is now assumed that the vehicle is stopped, for example, at a street intersection with a foot placed on the brake pedal. In this case, the sensors 142 to 144 all produce signals of the high level, and the AND gate 141 produces an output of the high level. Hence, the transistor 140 is rendered conductive to excite the solenoid 101. Accordingly, the pilot needle valve 98 is lifted up, and the compressed oil in the upper oil chamber 87 is released into the oil tank R. The valve body 85 moves upwards due to the hydraulic pressure from the operation oil path 41a acting on the lower oil chamber 88, the oil path 84 is communicated with the oil tank R, and the creep phenomenon is prevented from developing. In this case, even if the movement of valve body 85 is interrupted by the dust and dirt contained in the oil, the operation hydraulic pressure introduced into the lower oil chamber 88 is so large that the valve body 85 is forcibly moved upwards to the opening position.

When the foot is removed from the brake pedal and the throttle pedal is trod on to start the vehicle from the rest condition, the sensors 143, 144 produce signals of the low level, and the solenoid 101 is de-energized. Therefore, the hydraulic pressure becomes equal between the upper oil chamber 87 and the lower oil chamber 88. However, since the area of the first pressure receiving surface 85a of the valve body 85 is greater than the area of the second pressure receiving surface 85b thereof, the valve body 85 is downwardly moved to the closing position due to the force of the return spring 89 and the downwardly oriented pushing force produced by the difference between the areas. Therefore, the valve body 85 is not affected by the dust and dirt, and does not stay at the opening position.

FIG. 3 shows another embodiment according to the present invention, in which the portions corresponding to those of the above-mentioned embodiment are denoted by the same reference numerals. In the creep preventing valve Vc', an oil path 127 branched from the first signal oil path 47 that guides the governor pressure from the governor valve Vg, is connected to the upper oil chamber 87 via a check valve 128 which permits the flow of operation oil from the oil path 127 to the upper oil chamber 87 only. Further, a check valve 129 is provided between the orifice 93 and the upper oil chamber 87, so that the governor pressure Pg introduced into the upper oil chamber 87 will not reversely flow into the lower oil chamber 88. The check valve 129 is anchored at a predetermined position by the end of the return spring 89.

Operation of this embodiment will be described below. When the vehicle is stopped at a street intersection with a foot placed on the brake pedal, the pilot needle valve 98 is lifted up in the same manner as the above-mentioned embodiment, and the upper oil chamber 87 is communicated with the oil path 127 via the orifice 96 and by-pass oil path 102. In this case, the governor valve Vg works to maintain the governor pressure Pg zero. Therefore, the pressure in the upper oil chamber 87 decreases, and the spool valve body 85 moves upwards to open the oil path 84. Consequently, the hydraulic pressure in the operation oil path 41a decreases to be lower than the pressure for engaging the low-speed clutch $C_1$, and the creep phenomenon is prevented from developing.

When the vehicle is running, however, the governor pressure proportional to the square power of the vehicle speed is acting on the upper oil chamber 87. Therefore, the valve body 85 moves downwards to close the valve, and the creep preventing function is not produced. Further, since the first pressure receiving surface 85a of the valve body 85 has the area greater than that of the second pressure receiving surface 85b, increased downwardly oriented force exerts on the valve body 85; i.e., the valve body 85 is held at the closing position more reliably. In the middle speed region or higher speed region (in which the governor pressure Pg is not yet so high) where the application of engine brake will be required, the hydraulic pressure increases sufficiently in the operation oil path 41a. Therefore, even in case such a trouble happens to develop that the transistor 140 is short-circuited internally and the solenoid 101 is left excited, under the condition where the manual valve Vm is held at the first speed retaining position I in an attempt to apply the engine brake, the governor pressure Pg acts on the upper oil chamber 87, and the valve body 85 is held at the closing position. Namely, the engine brake can be applied reliably. Further, even if dust and dirt are contained in the operation oil, and the valve body 85 is not moved down by the force of the return spring 89 only, the hydraulic pressure assists the valve body 85 to reliably move to the closing position.

What is claimed is:

1. In a creep preventing device for vehicles equipped with an automatic transmission, comprising:

a fluid type torque converter;

an auxiliary transmission which has a frictionally engaging element for starting, and which is coupled to said torque converter; and a creep preventing valve disposed in an oil path that is branched from an operation oil path leading to said frictionally engaging element and that leads to an oil tank, said creep preventing valve being adapted to open said oil path during the idle operation of the vehicle;

the improvement wherein said creep preventing valve is constructed such that it is operated in the opening direction and the closing direction by the pressure of a hydraulic pressure source on opposite surfaces thereof.

2. A creep preventing device for vehicles equipped with an automatic transmission as defined in claim 1, wherein said creep preventing valve has a first pressure receiving surface of a larger area for receiving the hydraulic pressure from the hydraulic pressure source on the side of closing the valve, and a second pressure receiving surface of a smaller area for receiving said hydraulic pressure on the side of opening the valve, and wherein during ordinary operating conditions, said hydraulic pressure is allowed to act upon said two pressure receiving surfaces and during the idle operating condition, the hydraulic pressure acting upon the first pressure receiving surface is released.

3. In a creep preventing device for vehicles equipped with an automatic transmission, comprising:

a fluid type torque converter;

an auxiliary transmission which has a frictionally engaging element for starting, and which is coupled to said torque converter; and a creep preventing valve disposed in an oil path that is branched from an operation path leading to said frictionally engaging element and that leads to an oil tank, said creep preventing valve being adapted to open said oil path during the idle operation of the vehicle;

the improvement wherein said creep preventing valve has an oil chamber which closes said valve when a hydraulic pressure greater than a predetermined value is introduced thereinto, and to said oil chamber is connected an oil path which guides a hydraulic pressure from means that produces a signal pressure proportional to the vehicle speed.

4. A creep preventing device for vehicles equipped with an automatic transmission as defined in claim 3, wherein said creep preventing valve has a first pressure receiving surface of a larger area faced to said oil chamber, and a second pressure receiving surface of a smaller area which is faced to an oil chamber into which the hydraulic pressure of said operation oil path is introduced, and which receives said hydraulic pressure on the side of opening the valve, and wherein during ordinary operating conditions, the hydraulic pressure from said means for generating a signal pressure proportional to the vehicle speed and a hydraulic pressure of said operation oil path, are allowed to act upon said two pressure receiving surfaces and during the idle operating conditions, the hydraulic pressures acting upon the first pressure receiving surface are released.

5. A creep preventing device for vehicles equipped with an automatic transmission as defined in claim 1, wherein said creep preventing valve is actuated to open said oil path when a shift lever is shifted to a drive position, an engine speed is lower than a reference value, and at the same time when a brake pedal is trod on.

6. A creep preventing device for vehicles equipped with an automatic transmission as defined in claim 3, wherein said creep preventing valve is actuated to open said oil path when a shift lever is shifted to a drive position, an engine speed is lower than a reference value, and at the same time when a brake pedal is trod on.

* * * * *